United States Patent Office 3,128,289
Patented Apr. 7, 1964

3,128,289
PENTAERYTHRITOL AND TRIMETHYLOL-
ALKANE POLY(2,3-EPOXYALKANOATES)
Benjamin Phillips, Paul S. Starcher, and Donald L. Mac-
Peek, Charleston, W. Va., assignors to Union Carbide
Corporation, a corporation of New York
No Drawing. Filed Dec. 14, 1962, Ser. No. 244,548
8 Claims. (Cl. 260—348)

This invention relates to the preparation of glycidic esters.

This application is a continuation-in-part of application Serial No. 798,835 entitled Epoxidation of Unsaturated Compounds, by B. Phillips et al., filed March 12, 1959, which in turn is a continuation-in-part of application Serial No. 696,043, entitled Epoxidation of Unsaturated Compounds, by B. Phillips et al., filed November 13, 1957, now abandoned, both of said application being assigned to the same assignee as the instant application.

The synthesis of certain types of glycidic esters, i.e., 2,3-epoxy esters, are well known in the art. In 1892, Erlenmeyer produced ethyl β-phenyl-α, β-epoxypropionate by the interaction of benzaldehyde and ethyl chloroacetate in the presence of sodium. Between 1904 and 1932 Erlenmeyer's work was expanded by Darzens who generally favored the use of sodium ethoxide as the condensing agent. A modification by Darzens of his general procedure was the reaction of ketones or aldehydes with ethyl dichloroacetate and dilute magnesium amalgam, followed by hydrolysis of the product to produce β-hydroxy-α-chloroester. Treatment with sodium ethoxide provided the glycidic esters. The disadvantages of the Darzens process include small yields, undesirable side reactions, wide boiling point range, e.g., 5° to 10° C., of many reported glycidic esters indicating the presence of impurities such as isomeric carbon or oxygen alkylation products, recommended use of an inert atmosphere, economic barriers presented by the high cost of starting materials, and others.

The reaction with methyl sorbate and perbenzoic acid in chloroform over a period of from about 5 to 10 days gave only methyl 4,5-epoxy-2-hexenoate and not the 2,3-epoxy or glycidic type of ester. Another method reported in the literature involved the reaction of methyl crotonate and perbenzoic acid to prepare methyl 2,3-epoxybutyrate. A yield of 44 percent was obtained by a procedure involving a reaction period of several months at 8° C. in the absence of light. A recent work reported the epoxidation of the acrylate, of the α-methylacrylate, and of the crotonate esters by the use of the prohibitively expensive peroxytrifluoroacetic acid in a system buffered with disodium hydrogen phosphate. Almost universally a solvent such as methylene chloride or ethylene dichloride was required to minimize olefin polymerization.

The work of several investigators was summarized by Swern (Chem. Rev., 45, 50–51) in 1949 with respect to the epoxidation of alpha, beta-unsaturated esters with perbenzoic acid. His conclusions stated that the reactions of perbenzoic acid with an olefin bearing a carbonyl or carboalkoxy (—COOR) group in close proximity to the ethylenic bond was either slowed down to an exaggerated degree or prohibited by the presence of that group.

The invention contemplates the preparation of novel glycidic esters via the partial or essentially complete epoxidation of various olefinic esters such as those exemplified below using peracetic acid as the epoxidizing agent. Illustrative olefinic ester reactants which can be employed in the aforesaid epoxidation process include, for example, the pentaerythritol tetra(2-alkenoates), e.g., pentaerythritol tetra(acrylate), pentaerythritol tetra-(crotonate), pentaerythritol tetra(methacrylate) pentaerythritol tetra(α-ethyl-β-propylacrylate), and the like; the pentaerythritol monoalkanoate tri(2-alkenoates), e.g., pentaerythritol monoacetate tri(acrylate), pentaerythritol monopropionate tri(β-ethylacrylate), and the like; the pentaerythritol dialkanoate di(2-alkenoates), e.g., pentaerythritol diacetate di(acrylate), pentaerythritol diacetate di(crotonate), pentaerythritol diacetate di(methacrylate), pentaerythritol dibutyrate di(α-ethyl-β-propylacrylate), and the like; the 1,1,1-trimethylolalkane tri(2-alkenoates), e.g., 1,1,1 - trimethylolpropane tri(acrylate, 1,1,1 - trimethylolpropane tri-crotonate), 1,1,1-trimethylolpropane trimethylolpropane tri-crotonate), 1,1,1-trimethylolpropane tri-methacrylate), 1,1,1-trimethylolpropane tri(α-ethyl-β-propylacrylate), 1,1,1-trimethylolbutane tri(acrylate), 1,1,1-trimethylolhexane tri(acrylate), 1,1,1-trimethylolhexane tri(methacrylate), 1,1,1-trimethylolhexane tri(α-ethyl-β-propylacrylate), and the like. In general, the 2-alkenoate moiety of the olefinic ester reactant contains up to 8 carbon atoms.

Illustrative novel glycidic esters which result from the aforesaid epoxidation process include, among others, the pentaerythritol tetra(2,3-epoxyalkanoates), e.g., pentaerythritol tetra(2,3 - epoxypropanoate), pentaerythritol tetra(2,3-epoxybutanoate), pentaerythritol tetra(2-methyl-2,3-epoxypropanoate), pentaerythritol tetra(2-ethyl-2,3-epoxyhexanoate), and the like; the pentaerythritol monoalkanoate tri(2,3 - epoxyalkanoates), e.g., pentaerythritol monoacetate tri(2,3-epoxypropanoate), pentaerythritol monopropanoate tri(2,3-epoxypentanoate), and the like; the pentaerythritol 2-alkenoate tri(2,3-epoxyalkanoates), e.g., pentaerythritol monoacrylate tri(2,3-epoxypropanoate), pentaerythritol monocrotonate tri(2,3-epoxybutanoate), and the like; the pentaerythritol di(2-alkenoate) di(2,3-epoxyalkanoates), e.g., pentaerythritol diacrylate di(2,3-epoxypropanoate), pentaerythritol dicrotonate di(2,3-epoxybutanoate), and the like; the pentaerythritol tri(2-alkenoate) 2,3-epoxyalkanoates, e.g., pentaerythritol triacrylate 2,3-epoxypropanoate, pentaerythritol tricrotonate 2,3-epoxybutanoate, pentaerythritol trimethacrylate 2-methyl-2,3-epoxyacrylate, and the like; the pentaerythritol dialkanoate di(2,3-epoxyalkanoates), e.g., pentaerythritol diacetate di(2,3-epoxypropanoate), pentaerythritol dipropanoate di(2,3 - epoxypropanoate), pentaerythritol diacetate di(2,3-epoxybutanoate), pentaerythritol diacetate di(2-methyl-2,3-epoxypropanoate), and the like; the 1,1,1-trimethylolalkane tri(2,3-epoxyalkanoates), e.g., 1,1,1-trimethylolpropane tri(2,3-epoxypropanoate), 1,1,1 - trimethylolpropane tri(2,3 - epoxybutanoate), 1,1,1-trimethylolpropane tri(2-methyl-2,3-epoxypropanoate), 1,1,1 - trimethylolbutane tri(2,3-epoxypropanoate), 1,1,1 - trimethylolhexane tri(2,3-epoxypropanoate), and the like; the 1,1,1-trimethylolalkane 2-alkenoate di(2,3-epoxyalkanoates), e.g., 1,1,1-trimethylolpropane acrylate di(2,3-epoxypropanoate), 1,1,1-trimethylolpropane crotonate di(2,3-epoxybutanoate), and the like; the 1,1,1 - trimethylolalkane di(2-alkenoate) 2,3-epoxyalkanoates, e.g., 1,1,1-trimethylolpropane diacrylate 2,3-epoxypropanoate, 1,1,1 - trimethylolpropane dicrotonate 2,3-epoxybutanoate, and the like.

The olefinic ester reactants which are employed in the epoxidation reaction can be prepared by the reaction of pentaerythritol or 1,1,1-trimethylolalkane such as 1,1,1-trimethylolpropane with 2-alkenoic acid, e.g., acrylic acid, crotonic acid, etc., preferably at an elevated temperature and in the presence of an acidic catalyst, e.g., p-toluenesulfonic acid. After several hours reaction period, the water by-product can be removed from the resulting reaction product mixture via decantation of the water phase, followed by neutralizing the organic phase with, for example, sodium acetate, and then washing several times with water to remove salts and unreacted polyol, i.e., pentaerythritol or 1,1,1-trimethylolalkane, from said organic phase. Unreacted 2-alkenoic acid is readily removed from the desired olefinic ester product by conventional techniques, e.g., distillation, and said olefinic ester product can be further purified in accordance with known procedures in the art. To effect complete esterification in the aforesaid reaction, at least a stoichiometric quantity of 2-alkenoic acid per hydroxyl group of the polyol is employed.

The epoxidation reaction can be conducted at a temperature in the range of from about 0° to about 100° C., and preferably from about 25° to about 90° C. As a practical matter, the choice of the particular temperature at which to effect the expoxidation reaction depends, to an extent, on the nature of the olefinic ester reactant.

In general, the reaction time will vary depending on the concentration of the reactants, the particular olefinic ester reactant employed, the temperature, the type and degree of agitation of the reaction mixture, and other considerations. The reaction time can be as short as minutes in length or it can be as long as 12 hours or more, e.g., from about 30 minutes to about 18 hours.

It is desirable to conduct the epoxidation reaction with equipment which will not foster the polymerization of the olefinic ester reactant or catalyze the decomposition of peracetic acid. Equipment constructed of glass, stainless steel, aluminum and the like has been shown to be adequate for this purpose. If desired, a polymerization inhibitor or retarder such as hydroquinone, 2,4-dinitrophenol, 2,4-dinitro-m-cresol, and the like can be incorporated into the reaction mixture in an amount sufficient to prevent possible polymerization of the olefinic ester reactant. Provision can be made for heating and/or cooling the reactor contents. A suitable reflux-type condenser can be attached as an integral part of the equipment.

The particular manner of adding the reactants, i.e., the olefinic ester and peracetic acid, to the reaction vessel is not narrowly critical. One desirable procedure is to charge the olefinic ester to the reaction vessel and subsequently heat said ester to a predetermined temperature. At this temperature, and generally under constant agitation, peracetic acid, preferably in an inert organic medium such as ethyl acetate, acetone, and the like, is fed to the reaction vessel. Cooling is provided, if necessary, to compensate for the heat generated by the reaction. When the epoxidation reaction has gone to substantial completion or as far as desired, the reaction mixture can be separated into its various components, such as, by fractional distillation.

The use of an inert organic medium is not a prerequisite in the epoxidation reaction. However, it has been observed that a faster and cleaner reaction is effected by employing the peracetic acid in an inert organic medium such as ethyl acetate, acetone, and the like. A solution comprising from about 10 to 50 weight percent of peracetic acid, based on the total weight of peracetic acid and inert organic medium, is satisfactory; from about 20 to 40 weight percent of peracetic acid, based on the solution weight, is preferred. Theoretically, to effect substantially complete epoxidation of the olefinic ester, at least a stoichiometric quantity of peracetic acid per carbon to carbon double bond of the olefinic ester should be employed. However, to produce novel glycidic esters which contain both 2-alkenoate and 2,3-epoxyalkanoate moieties in the molecule, less than the stoichiometric quantity of peracetic acid per carbon to carbon double bond of the olefinic ester should be employed.

It is apparent from a consideration of this specification that the relative ease in which novel glycidic ester products result from the instant epoxidation reaction between the peracetic acid and the olefinic ester reactants is indeed surprising. According to various authorities and experts in the epoxy field such as Swern, supra, the epoxidation of an alpha, beta-olefinic ester, i.e., an ester wherein a double bond is conjugated with a carbonyl group on the carboxylic acid portion of the ester molecule, with an epoxidizing agent such as perbenzoic acid is effected with extreme difficulty, if at all. The successful epoxidation process afforded by the practice of the instant invention is completely unpredictable on the basis of information available in the literature. The laborious and arduous routes pursued by several skilled chemists in the epoxy field to effect the introduction of oxirane oxygen at the site of the alpha, beta double bond which is in conjugation with a carbonyl group is testimony lending to the unpredictability or the extreme difficulty encountered by a direct epoxidation route, i.e., a single-step epoxidation process. The instant invention, it is submitted, constitutes a definite and patentable advance in the epoxy art.

The advantages of the instant process are readily apparent from the single-step nature of the operation. In addition, an economic source of epoxide oxygen is utilized, i.e., peracetic acid, rather than expensive haloacetates and difficultly handled agents such as sodium amide or other prohibitively expensive peroxygen chemicals such as perbenzoic acid or peroxytrifluoroacetic acid.

The novel glycidic esters of the invention are a useful class of compounds. They can be hydrolyzed to glycidic acids as illustrated by the following equation:

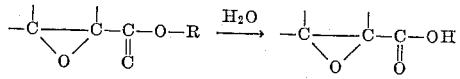

The utility of the glycidic acids is well recognized in the literature and by those skilled in the art. Decarboxylation of the resulting glycidic acids usually yields ketones or aldehydes depending upon whether the alpha substituent (on the alpha carbon atom of the glycidic acid) is a hydrogen atom or an alkyl radical. Glycidic esters, also, can undergo rearrangement of alpha- or beta- keto acids upon heating to an elevated temperature. Depending on the reaction conditions, glycidic esters can yield glycidic amides, hydroxy amino esters, or hydroxy amino amides on treatment with ammonia or amines.

The novel glycidic esters can be reacted, at elevated temperatures, with organic hardeners such as aliphatic polyfunctional amines, e.g., diethylenetriamine, triethylenetetramine, etc., in a ratio so as to provide, for example, one amino hydrogen of said polyfunctional amine per epoxy group,

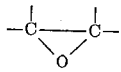

of glycidic ester to thus form useful resins having utility in the molding, adhesive, etc., art. Other organic hardeners such polycarboxylic acids and their anhydrides, e.g., phthalic acid, phthalic anhydride, tetrahydrophthalic anhydride, pyromellitic anhydride, maleic anhydride, and others can also be employed.

The following examples are illustrative.

EXAMPLE 1

A mixture of 268 grams of 1,1,1-trimethylolpropane (2 mols), 936 of α-ethyl-β-propylacrylic acid (6 mols), 300 grams of toluene, and 3.6 grams of p-toluenesulfonic acid was heated under reflux on a still having a decanter for the removal of water. After 67 hours, during which time the kettle temperature rose from about 150° C. to 175° C., a total of 100 grams of water layer had been removed by the decanter. The kettle material was neutralized with sodium acetate then washed 4 times with water to remove salts and unreacted 1,1,1-trimethylolpropane. The ester was dried and unreacted α-ethyl-β-propylacrylic acid was removed by stripping on a short column to a temperature of 240° C. at a pressure of 4 mm. of Hg. The product was then flash distilled on a one-plate column yielding 791 grams of material boiling at 194° C. to 240° C. at a pressure of 3 mm. of Hg. An analysis for ester by saponification indicated a purity of 98.5 percent of 1,1,1-trimethylolpropane tri(α-ethyl-β-propylacrylate).

| Elemental Analysis ($C_{30}H_{50}O_6$) | Found (percent) | Calculated (percent) |
|---|---|---|
| Carbon | 70.09 | 70.12 |
| Hydrogen | 9.84 | 9.94 |

EXAMPLE 2

A. *Preparation of 1,1,1-Trimethylolpropane Tri(2,3-Epoxy-2-Ethylhexanoate)*

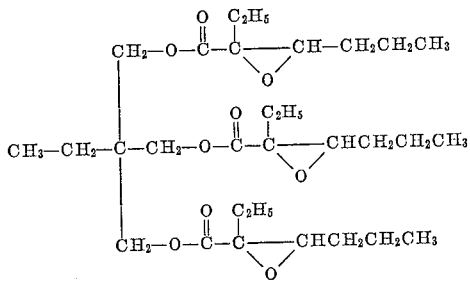

A solution (654 grams) of peracetic acid (25.6 weight percent) in ethyl acetate was added dropwise with stirring to 250 grams of 1,1,1-trimethyolpropane tri($\alpha$-ethyl-$\beta$-propylacrylate) over a one-hour period at 50° C. After 2 hours the temperature was raised to about 65–70° C. and held for an additional 5 hours. An analysis for peracetic acid indicated that the reaction had gone to completion. The volatiles were removed by stripping under reduced pressure in a one-plate column. The residue product was diluted with an equal volume of benzene and washed with 10 weight percent sodium hydroxide solution and with water to remove the last traces of acetic acid. The residue product, a colorless slightly viscous liquid, was dried by heating under vacuum. Analysis of the product for epoxide content by the hydrogen bromide method indicated a purity of 92 percent. The acidity was nil and the infrared spectrum was compatible with the structure assigned.

| Elemental Analysis ($C_{30}H_{50}O_9$) | Found (percent) | Calculated (percent) |
|---|---|---|
| Carbon | 64.49 | 64.91 |
| Hydrogen | 9.09 | 9.09 |

B. In an analogous manner as above, when 1,1,1-trimethylolpropane triacrylate is employed in lieu of 1,1,1-trimethylolpropane tri($\alpha$-ethyl-$\beta$-propylacrylate), there is is obtained 1,1,1-trimethylolpropane tri(2,3-epoxypropanoate).

C. In an analogous manner as above, when 1,1,1-trimethylolpropane tricrotonate is employed in lieu of 1,1,1-trimethylolpropane tri($\alpha$-ethyl-$\beta$-propylacrylate), there is obtained 1,1,1-trimethylolpropane tri(2,3-epoxybutanoate).

D. In an analogous manner as above, when 1,1,1-trimethylolhexane trimethacrylate is employed in lieu of 1,1,1-trimethylolpropane tri($\alpha$-ethyl-$\beta$-propylacrylate), there is obtained 1,1,1-trimethylolhexane tri(2-methyl-2,3-epoxypropanoate).

EXAMPLE 3

A mixture of 205 grams of pentaerythritol (1.5 mols), 1,248 grams of $\alpha$-ethyl-$\beta$-hexenoic acid (8 mols), 350 grams of toluene, and 6 grams of p-toluenesulfonic acid was heated under reflux on a still having a decanter for the removal of water. After 60 hours, during which time the kettle rose from about 160° C. to 175° C., a total of 105 grams of water layer had been removed by the decanter. The kettle material was neutralized with sodium acetate, then washed four times with water to remove salts and unreacted pentaerythritol. The ester was dried, and toluene and unreacted $\alpha$-ethyl-$\beta$-propylacrylic acid were removed by stripping on a 6-inch packed column, to a kettle temperature of about 230° C. at a pressure of 1.5 mm. of Hg. The residue product, 592 grams of pentaerythritol tetra($\alpha$-ethyl-$\beta$-propylacrylate), was a light amber viscous liquid having the following properties:

$n_D^{30}$ ------------------------------------- 1.4810
Purity by saponification analysis ------ percent -- 99.3

EXAMPLE 4

A. *Preparation of Pentaerythritol Tetra(2,3-Epoxy-2-Ethylhexanoate)*

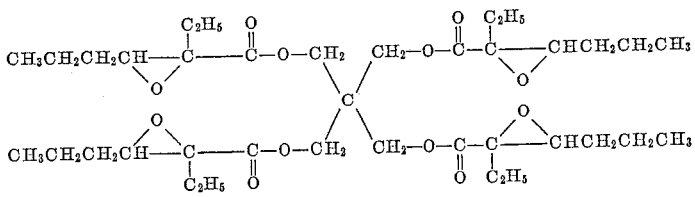

A solution (880 grams) of peracetic acid (25.6 weight percent) in ethyl acetate was added with stirring to 316 grams of pentaerythritol tetra($\alpha$-ethyl-$\beta$-propylacrylate) over a period of one hour at a temperature of 65° C. After an additional four-hour reaction period, an analysis for peracetic acid indicated that the reaction was complete. The volatiles were removed by co-distillation with ethylbenzene. The resulting residue product was a pale yellow, slightly viscous liquid having the following properties:

$n_D^{30}$ ------------------------------------- 1.4698
Purity by HBr analysis ------------- percent -- 85.6

The infrared spectrum was consistent with the assigned structure.

B. In an analogous manner as above, when pentaerythritol tetra(acrylate) is employed in leiu of pentaerythritol tetra($\alpha$-ethyl-$\beta$-propylacrylate), there is obtained pentaerythritol tetra(2,3-epoxypropanoate).

It is obvious that various modifications of this invention can be made by those skilled in the art without departing from the spirit and scope thereof.

What is claimed is:
1. A compound of the group consisting of pentaerythritol tetra(2,3-epoxyalkanoate) and 1,1,1-trimethylolalkane tri(2,3-epoxyalkanoate).
2. Pentaerythritol tetra(2,3-epoxyalkanoate).
3. 1,1,1-trimethylolalkane tri(2,3-epoxyalkanoate).
4. Pentaerythritol tetra(2,3-epoxy-2-ethylhexanoate).
5. Pentaerythritol tetra(2,3-epoxypropanoate).
6. Pentaerythritol tetra(2,3-epoxybutanoate).
7. 1,1,1-trimethylolpropane tri(2,3-epoxy-2-ethylhexanoate).
8. 1,1,1-trimethylolpropane tri(2,3-epoxypropanoate).

References Cited in the file of this patent

UNITED STATES PATENTS

| 2,485,160 | Niederhauser et al. | Oct. 18, 1949 |
| 2,559,177 | Terry et al. | July 3, 1951 |